(12) United States Patent
Rosenberger et al.

(10) Patent No.: US 8,939,786 B2
(45) Date of Patent: Jan. 27, 2015

(54) PLUG CONNECTOR WHICH CAN BE CLEANED EASILY

(75) Inventors: Bernd Rosenberger, Tittmoning (DE); Peter Steer, Munich (DE); Robert Rabitsch, Munich (DE)

(73) Assignee: Rosenberger Hochfrequenztechnik GmbH & Co, KG, Fridolfing (DE)

( * ) Notice: Subject to any disclaimer, the term of this patent is extended or adjusted under 35 U.S.C. 154(b) by 402 days.

(21) Appl. No.: 13/511,916

(22) PCT Filed: Nov. 4, 2010

(86) PCT No.: PCT/EP2010/006735
§ 371 (c)(1),
(2), (4) Date: Aug. 14, 2012

(87) PCT Pub. No.: WO2011/063888
PCT Pub. Date: Jun. 3, 2011

(65) Prior Publication Data
US 2012/0315083 A1    Dec. 13, 2012

(30) Foreign Application Priority Data

Nov. 25, 2009  (DE) .................... 20 2009 016 090 U

(51) Int. Cl.
  *H01R 13/627*  (2006.01)
  *H01R 13/502*  (2006.01)
  *H01R 13/629*  (2006.01)

(52) U.S. Cl.
  CPC ............ *H01R 13/629* (2013.01); *H01R 13/502* (2013.01); *H01R 13/6277* (2013.01)
  USPC ....................................................... 439/352

(58) Field of Classification Search
  USPC .................................................. 435/352, 595
  See application file for complete search history.

(56) References Cited

U.S. PATENT DOCUMENTS

| 4,134,634 | A  | * | 1/1979  | Baur et al. ...................... 439/352 |
| 5,167,522 | A  | * | 12/1992 | Behning ......................... 439/315 |
| 6,361,348 | B1 | * | 3/2002  | Hall et al. ...................... 439/352 |
| 6,619,876 | B2 | * | 9/2003  | Vaitkus et al. ................. 403/349 |
| 6,692,285 | B2 | * | 2/2004  | Islam ............................. 439/352 |
| 7,229,303 | B2 | * | 6/2007  | Vermoesen et al. ........... 439/271 |
| 7,238,047 | B2 | * | 7/2007  | Saettele et al. ................ 439/578 |
| 7,568,934 | B1 |   | 8/2009  | Williams |
| 8,568,167 | B2 | * | 10/2013 | Montena ........................ 439/584 |
| 2007/0105417 | A1 |  | 5/2007  | Camelio |

FOREIGN PATENT DOCUMENTS

| CA | 2387867  | A1 | 4/2001 |
| DE | 4439852  | A1 | 5/1996 |
| DE | 29918358 | U1 | 12/1999 |
| EP | 1626463  | A2 | 2/2006 |

\* cited by examiner

*Primary Examiner* — Briggitte R Hammond
(74) *Attorney, Agent, or Firm* — DeLio, Peterson & Curcio, LLC; Robert Curcio

(57) ABSTRACT

A plug connector having a plug body for holding the plug side of a socket body and having a resilient cage arranged on the plug body with resilient tongues which are axially slotted on the plug side, clasp the circumference of the socket body when it is mated with the plug body, and can be compressed radially by a locking sleeve which can be moved on the resilient cage. According to the invention, the resilient cage is itself arranged movably on the plug body and can be pushed back so far in the cable-side direction to a cleaning position that the plug-side end of the plug body is freely accessible.

12 Claims, 3 Drawing Sheets

PLUG CONNECTOR WHICH CAN BE CLEANED EASILY

This application is a National Stage filing based on PCT/2010/006735, filed Nov. 4, 2010, and which claims priority to German Patent Application No. DE 20 2009 016 090.4, filed Nov. 25, 2009.

BACKGROUND OF THE INVENTION

1. Field of the Invention

The invention relates to a plug-in connector of the so-called push-pull type.

2. Description of Related Art

In known plug-in connectors of the generic kind (see DE 10 2005 057 444 B3 for example), a so-called push-pull locking system is used. This usually performs its function satisfactorily because the plug-in connector can be coupled simply by pushing the plug member and the socket member together. In the inserted state, traction on the cable cannot cause the plug-in connector to be unintentionally disconnected in this case. Such disconnection of the plug-in connector takes place, deliberately, only when the push-pull locking system is released.

However, something which has proved to be a disadvantage of known plug-in connectors of the generic kind is that in the uninserted state they may become fouled or different foreign bodies may find their way into the unconnected plug-in connector, which means that insertion or coupling is no longer possible. The usual locking sleeves make it impossible for cleaning without aids to be carried out quickly, which means that such plug-in connectors are not suitable for use in the open air. When existing connector systems are fouled, either it is necessary for time and money to be spent in cleaning them with aids or, when the diameter of the contacts is small, they even become unusable or faulty.

SUMMARY OF THE INVENTION

Bearing in mind the problems and deficiencies of the prior art, it is therefore an object of the present invention, in order to overcome the disadvantages described, to design the plug-in connector in such a way that, while being simple in design, it also enables its contacts to be cleaned easily.

This object is achieved in accordance with the invention by a plug-in connector which has the features described herein and specified in the claims.

Advantageous embodiments thereof are described in the other claims.

Still other objects and advantages of the invention will in part be obvious and will in part be apparent from the specification.

The above and other objects, which will be apparent to those skilled in the art, are achieved in the present invention which is directed to a plug-in connector comprising a plug member having a plug-in end to receive a socket member, and a resilient cage which is arranged on the plug member, a cage having resilient tongues slotted axially at the plug-in end and fit around the circumference of the socket member when a socket member is coupled to the plug member and compressed radially by a locking sleeve, a locking sleeve being displaceable on the resilient cage, the resilient cage being displaceable on the plug member and, starting from a coupled position in which the plug-in end of the plug member, arranged inside a receiving space formed by the resilient tongues of the resilient cage, shiftable back in the direction of the cable end, to a cleaning position, such that the plug-in end of the plug member is freely accessible. The resilient cage being shiftable, back in opposition to the force exerted by a spring.

The spring is positioned on the plug member, supported between the resilient cage and a strain relief sleeve which surrounds the plug member.

The resilient cage is displaceable to the cleaning position through movement of the locking sleeve.

The locking sleeve includes resilient segments slotted axially at the cable end and which, when the locking sleeve is shifted back, butt against a stop on the resilient cage and displace the resilient cage.

A nut may be threadably attached to the stop on the resilient cage.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-3 of the drawings in which like numerals refer to like features of the invention.

The idea on which the invention is based is not only to arrange the locking sleeve to be displaceable on the resilient cage but also to make provision for the resilient cage itself to be displaceable on the plug member, so doing in such a way that it can be shifted back towards the cable end, to a cleaning position, sufficiently far for the plug-in end of the plug member to be freely accessible.

What is achieved hereby in a simple way is that the contacts provided at the plug-in end of the plug member, which are in particular POGO pin contacts, are easily accessible for cleaning because, for this purpose, the resilient cage can be shifted back to the desired cleaning position sufficiently far for the plug-in end of the plug member to be freely accessible.

It is of advantage if the resilient cage can be shifted back in opposition to the force exerted by a spring. The spring is usefully arranged on the plug member and is preferably supported between the resilient cage and a strain relief sleeve which surrounds the plug member.

To actuate the resilient cage, use may be made of the locking sleeve, the resilient cage thus being displaceable to the cleaning position by means of the locking sleeve.

In a particular embodiment the locking sleeve may, for this purpose, have resilient segments which are slotted axially at the cable end and which, when the locking sleeve is shifted back, butt against a stop on the resilient cage, such for example as against a nut screwed onto the resilient cage, and displace the resilient cage.

Figure 1:
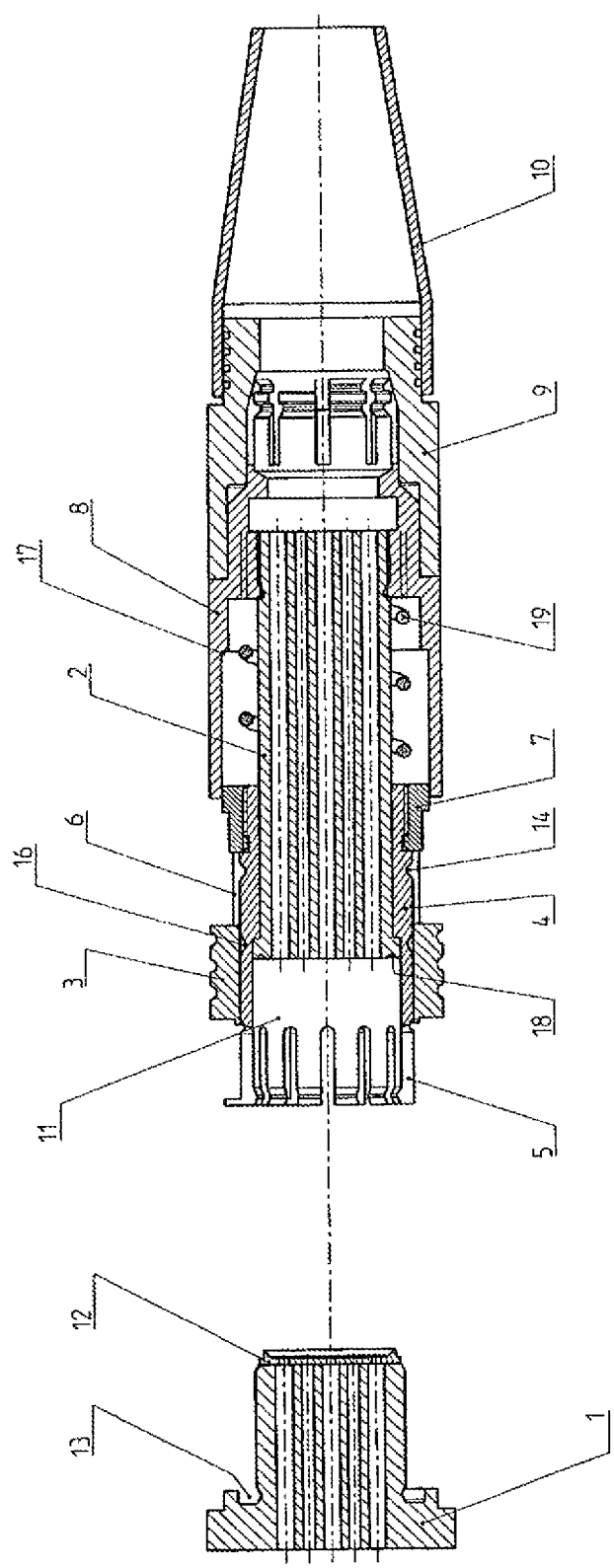
FIG. 1 is a schematic longitudinal section through the plug member and the socket member which is to be coupled thereto, in the uninserted state.

As can be seen from the drawings, and in particular from FIG. 1, a socket member 1, which is fitted with POGO pin socket contacts, is to be coupled to a plug member 2 which for its part is fitted with POGO pin contacts (not shown).

The plug member 2 has a lacking sleeve 3 which is axially displaceable on a resilient cage 4. The resilient cage 4 is arranged in turn on the plug member 2 to fit around it.

At its plug-in end, the resilient cage 4 is slotted axially, resilient tongues 5 being formed thereby which, when the plug-in connector is in the coupled state, i.e. when the socket member 1 is coupled to the plug member 2 (see FIG. 2), fit resiliently around the circumference of the socket member 1.

Following on from its corrugated gripping portion, the locking sleeve 3 has, at its cable end, axially slotted resilient segments 6 which, when the plug member 2 is in the uncoupled position, i.e. when the locking sleeve 3 is in the position shown in FIG. 1 where it is displaced towards the right, butt against a nut 7 which is screwed onto the cable end of the resilient cage 4.

As can also be seen from FIG. 1, the plug member 2 is fastened at the cable end into a strain relief sleeve 8, following on from which there are clamping nut 9 which likewise serves to provide strain relief and an anti-kink sleeve 10 which is screwed onto the clamping nut 9.

Figure 2:
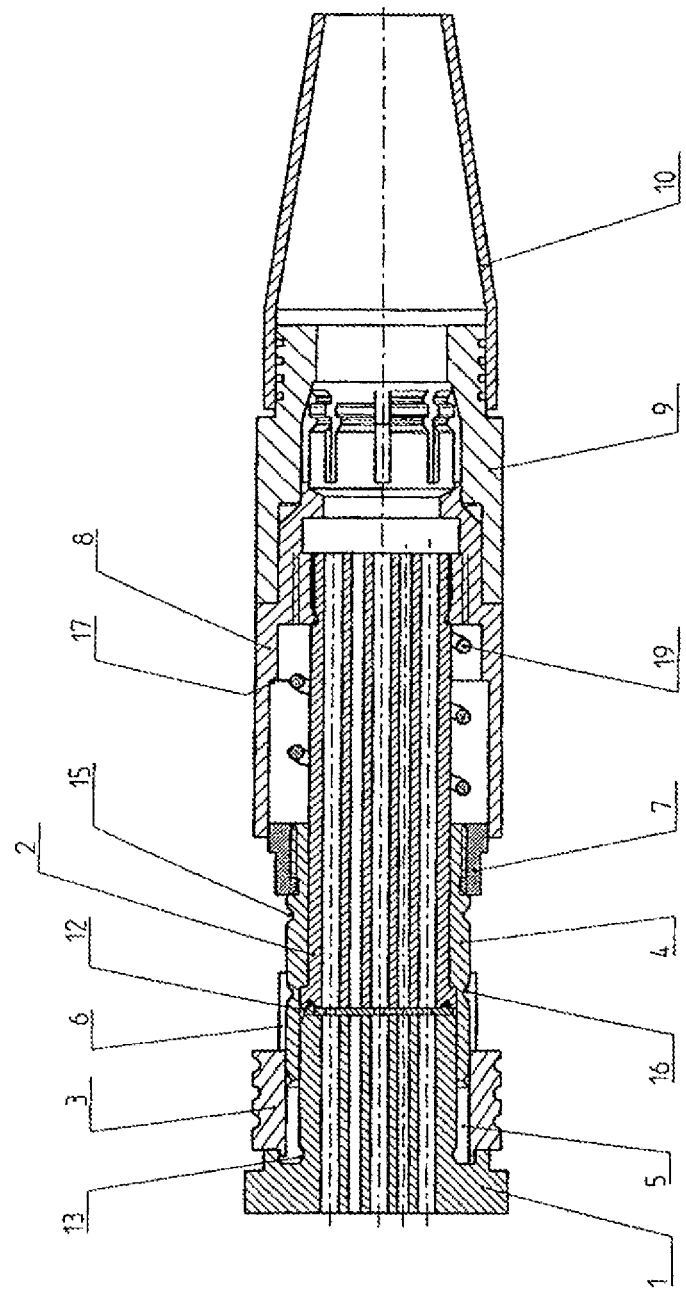
FIG. 2 shows the above in the inserted state.

To transfer the plug-in connector to the coupled state shown in FIG. 2, the socket member 1 is brought into the receiving space 11 formed by the resilient tongues 5 of the resilient cage 4 in such a way that it butts against the plug-in end face of the plug member 2 by a sealing pad 12 mounted on the end face, the POGO pin contacts of the plug member 2 then engaging in the POGO socket contacts of the sealing body 1. Also, the resilient tongues 5 of the resilient cage 4 fit round the circumference of the socket member 1, in such a way that they engage in an annular groove 13 in the socket member 1 by their front ends, which are of a concave configuration.

The locking sleeve 3 is then displaced in the forward direction, i.e. to the left in FIG. 2, from its rest position shown in FIG. 1, in which it is shifted to the right to the point where it butts against the nut 7 and engages in an annular groove 15 provided in the resilient cage 4 by inner shoulders 14 provided on the inner sides of its resilient segments 6, being so displaced until it butts against an annular shoulder of suitable configuration on the socket member 1.

In this position, as can clearly be seen from FIG. 2, the locking sleeve 3 engages in a further annular groove 16 in the resilient cage 4, likewise by the inner shoulders 14 provided on the inner sides of the resilient segments 6, thus causing the locking sleeve 3 to be locked in a suitable way by this means. In this position, the locking sleeve 3 compresses the resilient tongues 5 of the resilient cage 4 radially, and the socket member 1 is thus non-displaceably coupled to the plug member 2.

To uncouple the socket member 1 from the plug member 2, the locking sleeve 3 is therefore shifted to the right in FIG. 2 until its resilient segments 6 butt against the nut 7 on the resilient cage 4 and latch into the rear annular groove 15 by their inner shoulders 14. In this way, the resilient tongues 5 of the resilient cage 4 are released again in the radial direction and the socket member 1 can thus be withdrawn from the plug member 2.

To enable the POGO contacts of the plug member 2 to be made more satisfactorily accessible for cleaning than in the past, the invention provides a very special arrangement, namely to the effect that the resilient cage 4 is arranged to be displaceable on the plug member 2 and can be shifted back in the direction of the cable end, to a cleaning position, sufficiently far for the plug-in (left-hand) end of the plug member 2 to be freely accessible. For this purpose, the nut 7 on the resilient cage 4 is guided at its circumference on the inner circumference of the strain relief sleeve 8, namely until it reaches a stop on the inner circumference of the strain relief sleeve 8 which takes the form of an annular shoulder 17. By contrast, the extent to which the resilient cage 4 is displaceable towards the left of FIG. 1 is limited by an annular shoulder 18 on the plug-in end of the plug member 2 against which an inner shoulder which is not specifically identified on the resilient cage 4 butts.

The resilient cage 4 is subject to the force exerted by a positioning spring 19 which is arranged on the plug member 2 and which is supported between the resilient cage 4 and an internal shoulder in the strain relief sleeve 8.

If the POGO contacts of the plug member 2 are then to be made easily accessible for cleaning purposes, the locking sleeve 3 is shifted to the right in FIG. 1 from the position shown in FIG. 1 in which its resilient segments 6 butt against the nut 7 on the resilient cage 4 and are also latched into the annular groove 15 by their inner shoulders 14. As a result of this, the resilient cage 4 is also displaced to the right in FIG. 1 in opposition to the force exerted by the positioning spring 19 on the plug member 2, being so displaced as a maximum as far as the stop formed by the internal shoulder 17 in the strain relief sleeve 8 and until the gripping portion of the locking sleeve 3 butts against the front end of the strain relief sleeve 8.

Figure 3:
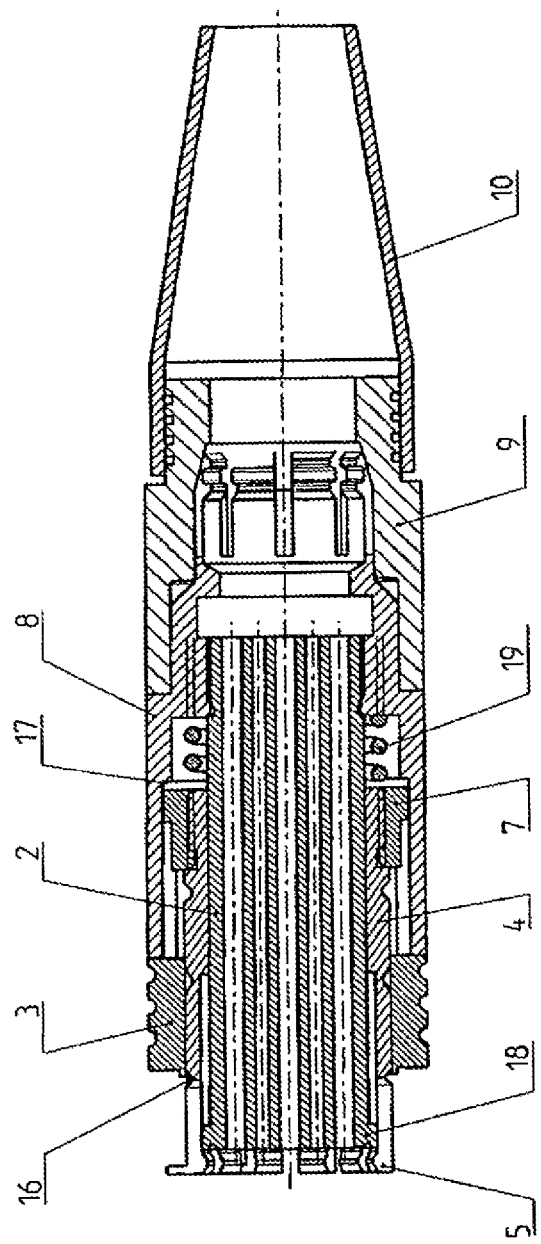
FIG. 3 shows the plug member in the cleaning position, i.e. with the resilient cage shifted back.

In this position, as can clearly be seen from FIG. 3, the whole of the plug-in end face of the plug member 2 is freely accessible and the POGO contacts which are located there can thus easily be cleaned.

If the displacing force exerted on the locking sleeve 3 is then released, the positioning spring 19 forces the resilient cage 4 back again towards the left in FIG. 1 and it thus again assumes its position defined by the annular shoulder 18 of the plug member 2 (FIG. 1). In this position, the socket member 1 can be coupled again to the plug member 2, the orientation of the plug member 2 relative to the socket member 1 being fixed by an unequal distribution of the resilient tongues 5 of the resilient cage 4.

Finally, attention is directed to the drawings and the claims for any features of the invention which have not been explained in detail.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A plug-in connector comprising a plug member having a plug-in end to receive a socket member, and a resilient cage which is arranged on the plug member, said cage having resilient tongues slotted axially at the plug-in end and fit around the circumference of the socket member when said socket member is coupled to the plug member and compressed radially by a locking sleeve, said locking sleeve being displaceable on the resilient cage, the resilient cage being displaceable on the plug member and, starting from a coupled position in which the plug-in end of the plug member, arranged inside a receiving space formed by the resilient tongues of the resilient cage, shiftable back in the direction of the cable end, to a cleaning position, such that the plug-in end of the plug member is freely accessible.

2. The plug-in connector of claim 1 including the resilient cage being shiftable, back in opposition to the force exerted by a spring.

3. The plug-in connector of claim 2 including positioning the spring on the plug member, supported between the resilient cage and a strain relief sleeve which surrounds the plug member.

4. The plug-in connector of claim 1 wherein the resilient cage is displaceable to the cleaning position through movement of the locking sleeve.

5. The plug-in connector of claim 4 wherein the locking sleeve includes resilient segments slotted axially at the cable end and which, when the locking sleeve is shifted back, butt against a stop on the resilient cage and displace the resilient cage.

6. The plug-in connector of claim 5 including a nut threadably attached to the stop on the resilient cage.

7. The plug-in connector of claim 2 wherein the resilient cage is displaceable to the cleaning position through movement of the locking sleeve.

8. The plug-in connector of claim 3 wherein the resilient cage is displaceable to the cleaning position through movement of the locking sleeve.

9. The plug-in connector of claim 7 wherein the locking sleeve includes resilient segments slotted axially at the cable end and which, when the locking sleeve is shifted back, butt against a stop on the resilient cage and displace the resilient cage.

10. The plug-in connector of claim 8 wherein the locking sleeve includes resilient segments slotted axially at the cable end and which, when the locking sleeve is shifted back, butt against a stop on the resilient cage and displace the resilient cage.

11. The plug-in connector of claim 9 including a nut threadably attached to the stop on the resilient cage.

12. The plug-in connector of claim 10 including a nut threadably attached to the stop on the resilient cage.

* * * * *